United States Patent [19]

Hannah et al.

[11] Patent Number: 4,798,879

[45] Date of Patent: Jan. 17, 1989

[54] CATALYZED FAST CURE POLYURETHANE SEALANT COMPOSITION

[75] Inventors: Steven L. Hannah, Chagrin Falls; Maureen R. Williams, Warrensville Hts.; Thomas W. Greenlee, Shaker Heights, all of Ohio

[73] Assignee: The B.F. Goodrich Company, Akron, Ohio

[21] Appl. No.: 30,773

[22] Filed: Mar. 25, 1987

[51] Int. Cl.$^4$ .................. C08G 18/81; C08G 18/08; C08G 18/10

[52] U.S. Cl. .......................... 528/45; 528/54; 528/61

[58] Field of Search ................ 528/45, 54, 61

[56] References Cited

U.S. PATENT DOCUMENTS

| | | | |
|---|---|---|---|
| 3,036,021 | 5/1962 | Trescher et al. | 528/54 |
| 3,248,371 | 4/1966 | Damusis | 528/45 |
| 3,267,078 | 8/1966 | Damusis | 427/385.5 |
| 3,940,542 | 2/1976 | Knopf et al. | 528/61 |
| 4,255,551 | 3/1981 | Wolf et al. | 528/45 |
| 4,258,186 | 3/1981 | Schott et al. | 528/45 |
| 4,424,353 | 1/1984 | Meyer et al. | 528/54 |

FOREIGN PATENT DOCUMENTS 45-40554 12/1970 Japan.
45-40553 12/1970 Japan.

*Primary Examiner*—Harold D. Anderson
*Assistant Examiner*—Dennis R. Daley
*Attorney, Agent, or Firm*—James R. Lindsay; Daniel J. Hudak

[57] ABSTRACT

A polyurethane sealant composition is made from a polyurethane prepolymer having blocked isocyanate groups. A 1,8-diaza bicyclo(5:4:0)undecene-7 (DBU) catalyst or a derivative thereof is utilized in association with an amine curing agent having at least two primary amine groups to achieve a relatively fast cure time. The catalyst is a true catalyst in that it merely aids in unblocking the isocyanate groups whereby the curing agent can react therewith.

10 Claims, No Drawings

CATALYZED FAST CURE POLYURETHANE SEALANT COMPOSITION

FIELD OF THE INVENTION

The present invention relates to a bicyclic amidine catalyst for unblocking isocyanate groups of a polyurethane prepolymer. More specifically, the present invention relates to the use of 1,8-diaza bicyclo(5,4,0)undecene-7 (DBU) or derivatives thereof as a catalyst in a polyurethane sealant composition.

BACKGROUND

Heretofore, various sealant compositions have been proposed. For example, U.S. Pat. No. 3,248,371 relates to a blocked isocyanate-terminated coating composition which is unblocked by reacting it with a hydroxy tertiary amine.

U.S. Pat. No. 3,267,078 relates to a coating composition that contains a blocked isocyanate-terminated polyether-based urethane intermediate and which is reacted with a diimine prepared by reacting a diamine with a carbonyl compound such as a ketone or an aldehyde.

SUMMARY OF THE INVENTION

Sealant compositions desirably have a combination of properties which render them particularly suitable for their intended applications. Such compositions should be able to be packaged in sealed containers or cartridges and stored for relatively long periods of time without objectionably "setting up" or hardening (as a result of cross-linking). When applied as a caulking sealant composition, they should form a relatively tack-free surface soon after being applied and exposed to atmospheric moisture and should cure without the formation of bubbles within an acceptable time period. They should also adhere tenaciously in the cured state to a wide variety of surfaces, such as to glass, aluminum, concrete, marble and steel surfaces. The sealant in the cured state should have sufficient elasticity and flexibility to withstand expansions and contractions of panels, etc. with which it is associated during temperature variations experienced as a result of climatic changes and to withstand wind forces that cause panels with which it is associated to flex or twist.

It is therefore an aspect of the present invention to provide a fast cure polyurethane sealant composition.

It is a further aspect of the present invention to provide a fast cure polyurethane sealant system, as above, wherein an unblocking bicyclic amidine catalyst is utilized.

It is another aspect of the present invention to provide a fast cure polyurethane sealant composition, as above, wherein the prepolymer is made from a polyether polyol intermediate and a polyisocyanate with the isocyanate groups being subsequently blocked so that the prepolymer has a relatively long shelf life.

It is yet another aspect of the present invention to provide a fast cure polyurethane sealant composition, as above, wherein a variety of amine curing agents having at least two primary amine groups therein can be utilized.

It is yet another aspect of the present invention to provide a fast cure polyurethane sealant composition, as above, wherein additives can be utilized such as thixotropes, alcohols, and other hydroxyl species which could not normally otherwise be utilized as they would react with free isocyanates.

It is yet another aspect of the present invention to provide a fast cure polyurethane sealant composition as above, wherein cure of the composition can be controlled from essentially instantaneous to one or two hours or longer by varying the amount of catalyst utilized.

It is yet another aspect of the present invention to provide a fast cure polyurethane sealant composition, as above, wherein cure occurs at ambient temperatures.

These and other aspects of the present invention will be better understood by reference to the following detailed disclosure.

In general, a polyurethane sealant composition comprises a cured polyurethane, said cured polyurethane made from a blocked polyurethane prepolymer, a curing agent, and an effective amount of a bicyclic amidine catalyst or a derivative thereof, said curing agent having at least two primary amine groups therein.

DETAILED DESCRIPTION OF THE INVENTION

The present invention relates to a curable polyurethane composition which contains two different components, that is a polyurethane prepolymer component as well as a curing agent component. The components are separately maintained from one another and are brought together generally at the application site whereupon cure readily occurs in a short period of time.

The prepolymer is made by reacting a hydroxy terminated intermediate with a polyisocyanate. The hydroxy terminated intermediate can be any conventional polyester polyol or a conventional polybutadiene polyol. Desirably, the hydroxy terminated intermediate is a polyether polyol. More specifically, a poly(oxyalkylene) diol or triol is utilized wherein the alkylene group contains from 2 to 6 carbon atoms with 3 carbon atoms being preferred. Thus, poly(oxypropylene) diol or triol can be utilzied with the latter being highly preferred. Suitable polyether polyols thus include polyethylene ether triol, polypropylene ether triol, polybutylene ether triol, and the like. In lieu of the above triol polyethers, the corresponding diol polyether can be utilized. The equivalent weight of the various hydroxyl terminated intermediates is from about 500 to about 10,000, desirably from about 500 to about 3,000, and preferably from about 1,000 to about 2,100. Such intermediates thus generally have a long flexible backbone which is desired for use in the present invention.

An optional, although often preferred, aspect of the polyether polyols of the present invention is that they are end capped with ethylene oxide end blocks. The provision of ethylene oxide end blocks provides a primary hydroxyl group which tends to be more reactive with polyisocyanate than the polyether polyol. The total amount of the ethylene oxide end caps is rather small, that is generally 10% or less by weight, and preferably 5% or less by weight based upon the total weight of the end capped polyethylene polyol. Amounts in excess of approximately 5% by weight of ethylene oxide end blocks are avoided since the intermediate tends to become moisture sensitive.

The polyisocyanates which can be utilized in the present invention desirably contain aromatic groups since aliphatic polyisocyanates generally cannot be unblocked and usually are not reactive. The aromatic polyisocyanates can generally be represented by the formula

wherein n is 2 or 3 with 2 being highly preferred. R is an aromatic or an alkyl substituted aromatic containing from about 6 to about 20 carbon atoms, with from 6 to about 15 carbon atoms being desired. Examples of specific aromatic polyisocyanates include the various diphenyl methane isocyanates, the various naphthalene diisocyanates such as naphthalene 1,5-diisocyanate, the various tolylene diisocyanates such as 2,4-tolylene diisocyanate and 2,6-tolylene diisocyanate, the various phenylene diisocyanates, the various toluene diisocyanates such as toluene-2,4-diisocyanate, the various biphenylene diisocyanates, and combinations thereof. A preferred polyisocyanate of the present invention is toluene diisocyanate.

The polyurethane prepolymer is readily prepared by mixing the polyether polyol with the polyisocyanate at ambient temperature and pressure although desirably the reaction is carried out at elevated temperatures, such as from about 60° C. to about 100° C. since the reaction rate is significantly increased. The equivalent ratio of the polyisocyanate to the the polyether polyol can be from about 0.8 to about 3.0. However, a slight excess is preferred to ensure complete reaction of the terminal hydroxy groups.

In order to provide a polymer that is more stable during storage, the isocyanate-terminated prepolymer described above is "blocked" with a blocking agent that reacts with the terminal isocyanate groups of the prepolymer. Blocking agents useful in the present invention include any of the conventional blocking agents as well as those known to the art and to the literature that produce blocked terminal isocyanates that do not react readily with moisture in air at room temperature (25° C.), but which will be readily "unblocked" and quickly or rapidly react with a curative of the present invention at room temperature. Such blocking agents include phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 1-hydroxy-2-propanone, 3-hydroxyacetophenone, 4-hydroxyacetophenone, ethyl acetyl acetate and cyclohexanone oxime. Sufficient blocking agent is reacted with the isocyanate-terminated polymer to theoretically "block" all of the terminal isocyanates, e.g. an equivalent excess, of the polymer. Generally, at least a 10% equivalent excess is utilized.

The polyurethane prepolymer of the present invention is cured with any conventional amine curing agent as well as those known to the art and to the literature which contain at least two primary amine groups therein. The amine curing agents can be compounds having from 3 to about 260 carbon atoms therein or desirably from about 6 to about 36 carbon atoms. Additionally, the amine curing agents can be a polymer having a molecular weight up to about 5,000 and desirably from about 200 to about 450. Examples of specific amine compounds include triethylene tetraamine, bisaminopropylpiperazine (BAPP), diethylene triamine, tris (2-aminoethyl) amine, 2-methyl pentamethylene diamine, isophorone diamine, and the like.

Various polymeric amines can be utilized such as the various Jeffamines produced by The Texaco Chemical Company. A desired polymeric amine are the Jeffamine D-400 compounds which generally have the following formula.

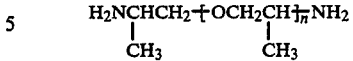

wherein n is 5 or 6. Numerous other polymeric amine compounds can be utilized such as the various other Jeffamine D series compounds wherein n varies from 2 to about 70, and other types of Jeffamines. As noted above, the basic requirement is that the amine curing agent contain at least two primary amine groups therein whether it be an amine compound or a polymeric amine compound.

Although various amine curing agents of the present invention can be utilized, including various combinations thereof, a desired amine curing agent is a blend of the Jeffamine D-400 amines and BAPP in relatively equal equivalent amounts of each compound, for example, from about 0.8 to about 1.2 equivalents of one compound based upon one equivalent of the remaining compound.

The amount of the amine curing agent containing at least two primary amines therein is from about 0.8 to about 1.2 equivalents and desirably about 1 equivalent for each blocked isocyanate equivalent.

Although the amine curing agents of the present invention are effective in removing the blocking agents and thus permitting the polyurethane prepolymer to cure, the time is generally slow as often from a few hours to many days. However, according to the concepts of the present invention, it has been found that a particular catalyst and various derivatives thereof, e.g. a reation product, are effective in quickly removing the blocking agents thereby permitting the amine curing agent to rapidly cure the polyurethane prepolymer in a very short period of time, generally within a couple hours, desirably within an hour, and possibly within a matter of minutes. The effective catalyst of the present invention is a bicyclo amidine and specifically is 1,8-diaza bicyclo(5:4:0)undecene-7, that is DBU, and generally has the following formula

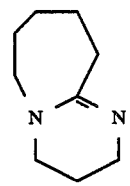

The various derivatives or reaction products of DBU which can be utilized in the present invention as a catalyst include the reaction product of DBU with phenol, as well as with various other acidic compounds. Such acidic compounds include the various sulfonic acids such as p-toluenesulfonic, sulfimides, sulfamides, phosphonic acids, the various N-sulfonylcarboxamides which have a total of from 2 to about 36 carbon atoms, and the various carboxylic acids which have a total of from 2 to 18 carbon atoms. The reaction product with phenol is desired whereas the unreacted catalyst DBU, is preferred.

The amount of the unblocking catalyst often depends upon the application and desired end result since larger amounts of catalyst generally effect a quicker cure time. That is, amounts can utilized to effect a cure in a hour or two or in a matter of minutes. Still higher amounts can effect cure almost instantaneously. Generally, the amount of catalyst can range from about 0.01 to about 2.5 parts, desirably from about 0.02 to about 1.2 parts, and preferably from about 0.1 to about 0.25 part by weight per 100 parts by weight of prepolymer.

As noted, the polyurethane sealant composition of the present invention is generally contained as two separate components. That is a prepolymer or base component and a curing agent component. The curing agent component generally contains the amine curing agent, the DBU catalyast or derivatives thereof, as well as optional plasticizers, pigments, thickeners, drying agents, and the like. The base component contains the prepolymer as well as various conventional additives or compounding ingredients such as fillers, thickeners or thixotropic agents, pigments, plasticizers, UV absorbers, solvents, and the like.

The base component generally contains large amounts, that is from about 60 to about 200 parts by weight per 100 parts by weight of prepolymer of a filler such as talc, various silicates, various clays, calcium carbonate, and the like. The thickening agents are generally thixotropic compounds such as hydrogenated castor oils, fumed silica, cross-linked acrylates, and the like, and utilized in amounts of from about 10 to about 30 parts by weight per 100 parts by weight of prepolymer. The amount of UV absorbers are generally very small, usually less than 1 or 2 parts by weight per 100 parts by weight of prepolymer and include the various hindered amines benzotriazoles, and hindered phenols. The plasticizers can include the various phthalates, the various adipates such as dioctyl adipate, dipropylene glycol dibenzoate, and the like, in amounts of from about 15 to about 50 parts by weight per 100 parts by weight of prepolymer. Solvents are generally utilized to adjust the viscosity of the prepolymer or base component to a desired range and constitute less than 10% volatility of the total composition. Suitable solvents include naphthalene, toluene, xylene, and the like. Pigments such as titanium dioxide, iron oxides, carbon black, and the like, can be utilized in suitable amounts to achieve a desired color.

It is noted that the curing agent component can also contain some of the above compounds such as the fillers, the thickening agents, the plasticizers, the pigments, and the like.

The amount of the prepolymer component with respect to the curing agent component can vary over a wide range depending upon a desired end use with a preferred range often being from about 10 parts to about 12 parts by weight of the prepolymer component per 1 part by weight of curing agent component. The polyurethane sealant composition of the present invention naturally is stored as two separate components. It is then combined and immediately applied to a substrate, etc. to achieve a desired utility such as forming a sealant between curtain wall sections, between concrete, between stone, or between any construction material.

The polyurethane sealant composition of the present invention has certain inherent advantages over conventional free isocyanates and polyol cure systems in that the prepolymer component containing the blocked isocyanate prepolymer is more stable than free isocyanate systems. Since the prepolymer component system is not predried or prereacted, it can contain additives that normally would react with free isocyanate such as hydrogenated castor oil, alcohols, and the like. The cure time can be adjusted from instantaneous, that is, a few seconds, hours or even longer, by varying the concentration of the catalyst. The DBU compound or DBU derivative is a true catalyst and final properties are unaffected by its presence. Other conventional urethane catalysts such as tin salts have been found not to work with regard to the blocked isocyanate prepolymer. The fast cure times of the present invention are accomplished at room temperature, that is at ambient or even sub-ambient temperatures as from about 0° C. to about 60° C., and preferably from about 20° C. to about 30° C.

The polyurethane sealant compositions of the present invention will be better understood by reference to the following example.

EXAMPLE

A prepolymer component was prepared from the following compounds. The urethane prepolymer was made from an ethylene oxide end capped (approximately 5% by weight) polyoxypropylene triol reacted with toluene diisocyanate and subsequently blocked with nonyl phenol.

| BASE COMPONENT FORMULATION | |
|---|---|
| DESCRIPTION OF THE CHEM. ITEM | PARTS BY WEIGHT |
| 6,000 molecular wt. trifunctional blocked isocyanate prepolymer | 100 |
| Hydrogenated castor oil | 14 |
| Calcium Carbonate | 60 |
| Aliphatic Solvent, Naphtha | 3 |
| Dipropylene Glycol Dibenzoate | 20 |
| Pigment, $TiO_2$, carbon black, iron oxides | 8 |
| UV Stabilizer, benzotriazole/hindered amine | 0.5 |

The prepolymer composition was prepared as follows: 33⅓ parts of the urethane prepolymer was added to a clean caulk mixer rotating at 5 RPM along with the UV stabilizers and the hydrogenated castor oil. The compounds were mixed at 20 RPM for 15 minutes until uniform and then an additional 33⅓ parts by weight of the prepolymer was added along with the calcium carbonate. The compounds were then mixed for 15 minutes at 20 RPM until well dispersed and examined for lumps. When no lumps remained, the remaining 33⅓ parts by weight of the prepolymer was added along with the plasticizer. The compounds were then mixed at 15 RPM under heat until the temperature reached 125° F.–130° F. The mixer was then cooled to 115° F. at which time the solvent was added Mixing was continued until a uniform blend was obtained.

The curing agent component had the following formulation.

| CURING AGENT COMPONENT FORMULATION | |
|---|---|
| DESCRIPTION | WT. PERCENT OF COMPOUND |
| Dipropylene glycol dibenzoate | 58 |
| Titanium dioxide | 0.9 |
| Hydrophobic fumed silica | 5.9 |
| Methyl trimethoxy silane | 0.3 |
| BAPP | 11 |
| Jeffamine D-400 | 23 |
| DBU | 0.8 |

The preparation of the curing component was as follows. Into a clean mixer under a nitrogen atmosphere was charged the dipropylene glycol dibenzoate plasticizer, the titanium dioxide pigment, and the fumed silica and mixed at 40 RPM for 5 minutes. The methyl trimethoxy silane drying agent was then added and mixed at 20 RPM for about 10 minutes. The amine curing agent and the DBU catalyst were then added and mixed at 20 RPM for about 10 minutes. A vacuum was pulled to 27 inches of mercury until the composition was completely de-aired and packaged. The base component and the curing agent component were mixed in the desired stoichiometric proportion of 1 to 1, that is approximately 12 parts by weight of the base component to approximately 1 part by weight of the curing agent component. The components were applied with a two component meter-mix pump with a static mixing device on the nozzle. The mixed composition was then applied between aluminum and granite curtain wall sections and formed a sealed joint. The joint was flexible and good adhesion was obtained within 20 minutes.

The sealant compositions of the present invention have excellent storage stability in sealed containers, have excellent flowability characteristics and thus can be pumped or utilized in caulking guns, have good flexibility and pliability, do not shrink objectionably upon curing, and have good adhesion to various primed substrates.

While in accordance with the patent statutes, a best mode and preferred embodiment have been set forth in detail, the scope of the present invention is not limited thereto, but rather by the scope of the attached claims.

What is claimed is:

1. A curable polyurethane composition, comprising, a polyurethane prepolymer component, said polyurethane prepolymer component made from a polyester polyol, a polybutadiene polyol, or a poly(oxyalkylene) polyol and an aromatic polyisocyanate, said alkylene group of said poly(oxyalkylene) polyol having from 2 to 6 carbon atoms said polyurethane prepolymer having blocked isocyanate groups, a curing agent component, said curing agent component comprising an amine curing agent containing at least two primary amines, and an effective amount of a bicyclic amidine catalyst or a derivative thereof capable of unblocking said blocked isocyanate groups.

2. A curable polyurethane composition according to claim 1, wherein said bicyclic amidine catalyst is 1,8-diaza bicyclo(5:4:0)undecene-7, (DBU), wherein said derivative of said catalyst is the reaction product of said catalyst with phenol, a sulfonic acid, a sulfimide, a sulfamide, a phosphonic acid, a N-sulfonylcarboxamide having a total of from 2 to 36 carbon atoms, or a carboxylic acid having from 2 to 18 carbon atoms, wherein said blocked urethane prepolymer is made with a blocking agent subsequently blocking terminal isocyanate groups, and wherein the amount of said catalyst is from about 0.01 to about 2.5 parts by weight per 100 parts by weight of said prepolymer.

3. A curable polyurethane composition according to claim 2, wherein said derivative is the reaction product of DBU with phenol or 2-ethyl hexanoic acid.

4. A curable polyurethane composition according to claim 3, wherein said prepolymer is made from a poly(oxyalkylene) polyol, wherein said poly(oxyalkylene) polyol has an equivalent weight of from about 500 to about 3,000, wherein said poly(oxyalkylene) polyol optionally has ethylene oxide end blocks with the total amount of said ethylene oxide end blocks being 10% by weight or less based upon the total weight of said end blocked poly(oxyalkylene) polyol, wherein said polyisocyanate is an aromatic diisocyanate, and wherein said amine curing agent contains a total of from 3 to about 260 carbon atoms or is a polymer having a molecular weight up to about 5,000.

5. A curable polyurethane composition according to claim 4, wherein the amount of said catalyst is from about 0.02 to about 1.2 parts by weight per 100 parts by weight of said prepolymer.

6. A curable polyurethane composition according to claim 4, wherein said poly(oxyalkylene) polyol is a poly(oxypropylene) diol or triol, and wherein said aromatic diisocyanate is toluene diisocyanate.

7. A curable polyurethane composition according to claim 6, wherein said blocking agent is phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 1-hydroxy-2-propanone, 3-hydroxy-acetophenone, 4-hydroxyacetophenone, ethyl acetyl acetate and cyclohexanone oxime, and wherein the amount of said catalyst is from about 0.1 to about 0.25 parts by weight per 100 parts by weight of said prepolymer.

8. A curable polyurethane composition according to claim 2, wherein said separate components are brought together and cured at an ambient temperature of from about 0° C. to about 60° C.

9. A curable polyurethane composition according to claim 3, wherein said separate components are brought together and cured at an ambient temperature of from about 0° C. to about 60° C.

10. A curable polyurethane composition according to claim 3, wherein said separate components are brought together and cured at an ambient temperature of from about 20° C. to about 30° C.

* * * * *